United States Patent

[11] 3,617,580

| [72] | Inventors | Jerome Geyer<br>Elizabeth;<br>Shih-en Hu, Roselle, both of N.J. |
|---|---|---|
| [21] | Appl. No. | 784,178 |
| [22] | Filed | Dec. 16, 1968 |
| [45] | Patented | Nov. 2, 1971 |
| [73] | Assignee | Esso Research and Engineering Company |

[54] LUBRICATING OIL TREATMENT SYSTEM
4 Claims, No Drawings

[52] U.S. Cl. .................................................. 210/60,
210/168, 210/DIG. 1
[51] Int. Cl. ........................................................ B01d 37/00
[50] Field of Search ............................................ 210/38,
502, 503, 505, 506, 168, 289, 288, 287, 282, DIG.
1, 60

[56] References Cited
UNITED STATES PATENTS

| Re.25,464 | 10/1963 | Duke et al. ................ | 210/502 X |
|---|---|---|---|
| 2,220,641 | 11/1940 | Davis............................ | 210/503 X |
| 2,262,526 | 11/1941 | Fairlie et al.................. | 210/168 X |
| 2,581,277 | 1/1952 | Morgenthaler............... | 210/287 X |
| 2,566,353 | 9/1951 | Mills............................. | 210/38 X |
| 2,748,057 | 5/1956 | Goren .......................... | 210/38 X |
| 2,925,379 | 2/1960 | Fleck et al. .................. | 210/38 X |
| 3,182,803 | 5/1965 | Chisholm .................... | 21/288 X |
| 3,400,884 | 9/1968 | Hundenborn et al. ........ | 210/287 X |
| 3,485,763 | 12/1969 | Lefevre et al................ | 210/38 |
| 3,224,592 | 12/1965 | Burns et al................... | 210/493 |
| 3,279,607 | 10/1966 | Michaelson ................. | 210/223 |

*Primary Examiner*—J. L. DeCesare
*Attorneys*—Pearlman and Stahl and Ernest V. Haines ABSTRACT: A lubricating oil treatment system for internal combustion engines involves the circulation of such oil from an engine through an oil filter and returning the filtered oil to the engine. In this system, the oil filter or another chamber located either before or after the oil filter and through which the oil is circulated contains a relatively oil-insoluble solid inorganic element or particulate mixtures of two or more of such element, having an atomic number between 13 and 83, inclusive, and selected from the group consisting of Groups IIIA, IVA, VA, IB, IIB, IIIB, IVB, VB, VIB VIIB and VIII of the Periodic Table. The elements selected are those which upon being oxidized under the conditions obtained from their 0 valence state to an initial cation valence state have an $E°$ oxidation-reduction potential greater than $-0.94$ volts, if measured in acid solution and greater than 0 volts, if measured in alkaline solution, with regard to the standard hydrogen electrode.

Inert filter elements may be employed within the oil filter in layer form interspersed with retained solid particles of the aforementioned elements or the elements may be interspersed within the porous filter elements such as porous paper, diatomaceous earth, kaolin, kieselguhr, cotton waste and linters, activated clay, charcoal or fuller's earth. Optionally, separate chambers containing the solid element may be inserted in the oil circulation system either before or after the oil filter. The preferred reducing elements are present conveniently in particle sizes ranging between about −4 and about 150 mesh standard Tyler screen size.

3,617,580

LUBRICATING OIL TREATMENT SYSTEM

DESCRIPTION OF THE INVENTION

The present invention relates to a novel lubricating oil circulation system used in association with internal combustion engines and involves the circulation of mineral lubricating oil from the crankcase of an internal combustion engine through a filter and the returning of the filtered oil into the internal combustion engine for reuse therein. More particularly, the invention relates to oil filters and optionally to a chamber ahead of or after the oil filter for contacting the oil with relatively oil-insoluble solid inorganic elements by placing such elements in their elemental and particulate form in the oil filter in a filter cartridge contained within the oil filter or in the aforementioned contact chamber. The elements so placed may be a single element, although, mechanical particulate mixtures of two or more of such elements may also be employed. These elements are selected from Groups IIIA, IVA, VA, IB, IIB, IIIB, IVB, VB, VIB, VIIB and VIII, of the Periodic Table, as presented by E. H. Sargent and Company, Copyright 1964 and entitled "Periodic Table of the Elements." The elements which may be utilized successfully are those which have an atomic number ranging between 13 and 83, inclusive and which upon being oxidized under the conditions obtaining from their 0 valence state to their initial cation valence state, i.e., their positive valence state, have an $E°$ oxidation-reduction potential greater than −0.94 volts, if measured in acid solution and greater than 0 volts, if measured in alkaline solution, with regard to the standard hydrogen electrode.

Numerous attempts have been undertaken in the past to improve or prolong the usefulness of lubricating oils used in the lubrication of internal combustion engines, especially so because under modern-day condition such oils must withstand severe superatmospheric temperatures while in contact with air and oxides of nitrogen which find their way into the crankcase of an engine by reason of the blowby of combustion gases from the combustion chambers. The failure to withstand such temperatures under such gaseous conditions leads to rapid degradation and/or oxidation of the oil contaminants with the resultant formation of various oxidized compounds such as carboxylic acids, aldehydes, ketones and the like which, together with their partially oxidized precursors, collectively create sludge problems. The oxidative degradation and formation of deposits in the lubricating oils is a problem which has existed for many years and is becoming more pressing for a solution with advancing technology and present day requirements for lubricating oils having temperature stability when temperatures of the oil approach 300° to 400° F. under heavy-duty service conditions. Corrosion of metal surfaces of engines is also a major consideration and concern under these extremely severe conditions of engine operation. Additionally, the nitrogen in the air introduced into the combustion chambers and subjected to combustion conditions becomes transformed into oxides of nitrogen. It is already well known that these products resulting from the reaction of nitrogen oxides when present in such oils induce rapid sludge formation. The nitrogen oxides are extremely harmful. It is therefore desirable to maintain a minimum of nitrogen oxides in the oil in order to avoid sludge formation to as great an extent as is possible.

In the past, the formation of degradation products has been reduced to some extent and the development of excessive acidity has been reduced to some extent by the use of organic inhibiting agents or basic substances, respectively, see U.S. Pat. No. 1,234,862, July 31, 1917. However, in most instances, the additives employed have been relatively highly oil-soluble because it was desired that these agents be intimately contacted with all portions of the oil, the bearing surfaces and the internal metal surfaces of the engines during operation. Because of this fact, i.e., high oil solubility, it has oftentimes been necessary to add an excess of these oxidation inhibiting or acidic neutralizing agents in order that the point at which they have become completely consumed, reacted or broken down will substantially coincide with the point in time of use at which the oil will normally be replaced anyhow. However, such "overcharging" of the oil with an oxidation inhibitor or with a base sometimes results in a tendency to accelerate sludge formation either because of the inherent increase in the alkalinity of the additive employed, the increased concentration of the oxidation inhibitor, if it happens to be acidic in nature, or because of thermal instability and/or by reason of adverse synergistic or catalyzed effects imparted by the additives to the oil during use. The problem has most always been attacked by attempting to homogeneously distribute the desired antioxidant or neutralizing agent throughout the entire quantity of the oil present in the engine for the entire length of time that the oil is present in the engine.

A number of patents have appeared in which attempts have been made to either regenerate used oil or to prevent the undue oxidation of fresh oil during use by treating the oil with solid inorganic relatively oil-insoluble materials. For example, Sarui, U.S. Pat. No. 3,154,488, provides, in a filter, at least one first metal in electrical contact with at least a second metal, the first metal being formed of a metal or alloy thereof capable of producing a metallic salt upon contacting an acidic material contained in the oxidized mineral oil to be regenerated. These electrical couplets, involving the use of metals, such as magnesium, aluminum, zinc, tin or antimony coupled with a second metal or another metal mentioned in the first group. Examples of the metallic couplets are shown to be magnesium-tin, magnesium-zinc, aluminum-tin, magnesium-silver, tin-nickel, zinc-tin, and a three-component system such as magnesium-zinc-aluminum. Another method which has been employed for the purpose of treating lubricating oils during use and while circulating either as a separate treatment or in an oil filter involves the use of metallic alloys in association with another metallic couplet. See Puddington, U.S. Pat. No. 2,852,454. Still other patents such as French Pat. Nos. 1,174,549; 1,185,062 and 1,256,287 show the use of metallic alloys either in oil filters or as crankcase oil plugs. Such alloys are intended to minimize lubricating oil degradation. They may employ magnesium alloys with calcium, aluminum, lithium, or zinc or they may use ternary alloys, for example, magnesium, aluminum and zinc. Also, aluminum may be alloyed with lithium and so forth. Such alloys and couplets are effective for the reason that the acidic compounds formed in lubricating oils during use are believed to be neutralized or the oxidation products are believed to be reduced through the setting up of electromotive forces between electrical couplets as in Sarui, supra.

The present invention is directed to the correction of the problems of sludge formation and corrosion that have previously existed. However, a different approach is involved. It has now been recognized that, to a large extent, the corrosiveness of the degraded oil comes about by reason of a first formation of oxidized species and precursors in the oil. The hereinafter described novel procedure assures a quick and prompt treatment of these substances with inorganic elements of a reducing nature which tend to minimize the further formation or continued presence of such substances.

The novel solid inorganic treating agents are relatively oil-insoluble and are of a reducing nature. Specific single elements or particulate admixtures of two or more such elements, as distinguished from alloys or metal couplets, of sufficient large particle size to be retained in a solids-oil contact chamber, such as an oil filter, or separate solids-oil contact chamber, in an oil circulating system are employed. They are selected from the Periodic Table as shown by E. H. Sargent and Company, Copyright 1964 and have an atomic number between 13 and 83, inclusive. Any single element or particulate mixture of elements coming within Groups IIIA, IVA, VA, IB, IIB, IIIB, IVB, VB, VIB, VIIB and VIII of this Periodic Table and which upon being oxidized from its 0 valence state to its initial cation valence state has an $E°$ oxidation-reduction potential greater than −0.94 volts, if measured in acid solution and greater than 0 volts, if measured in alkaline solution may be employed in practicing the herein described novel process. The elements must be solid at ambient temperatures. The definition of the oxidation-reduction potential of $E°$ is to be found in the book authored by Wendall M. Latimer, entitled "Oxidation Potentials," Second Edition, Fifth Printing (Aug. 1961) pages 2 and 3 and the potential values for the various oxidation-reduction species are to be found in tables 84 and 85 appearing at pages 339–348. The $E°$ values shown in the present description, examples, and appended claims are those given only for the next higher oxidative stages starting with the 0 valence of the element. This, of course, does not exclude the additional reducing benefit to the lubricating oil derived from the further oxidation of the initially formed oxidative compound where further oxidation does, in fact, take place. Thus, for example, the initial oxidation of metallic copper to the cuprous form has an oxidation-reduction potential $E°$ value of $-0.5$ and for the cuprous value to be oxidized to the cupric state an oxidation-reduction potential $E°$ value of $-0.153$, with the overall oxidation-reduction potential of the $E°$ value from metallic copper to the cupric form being $-0.337$. Since all of these values exceed $-0.94$, the reducing effect of metallic copper includes its further oxidation from the initial cuprous stage to the final cupric stage. Similarly, it is still of a beneficial and effective nature to employ an element in its 0 valence state where the $E°$ value for oxidation stages beyond the initial oxidation stage possesses a value which is below $-0.94$ where the initial oxidation stage has a value in acid solution greater than $-0.94$. An example is manganese in going from 0 valence to $+2$ valence with an $E°$ value of $+1.18$ but in going from the manganous to the manganic form has the unsuitable value of $-1.51$. So long as the $E°$ value when measured in acid solution at some stage of oxidation is greater than $-0.94$, the use of an element of the aforementioned types is effective in reducing nitrate ion to nitrite ion and thus will be effective in reducing sludge formation.

From a description of the definition of $E°$ it is obvious that the potential values are measured under standard conditions. All the hereinstated references to the Latimer book are intended to incorporate that body of information into this description by express reference.

Specifically, the following elements are useful when used in their elemental form for the treatment of mineral lubricating oils during the operation of an oil circulation system while an internal combustion engine is in use. These elements are as follows: arsenic, scandium, aluminum, titanium, zirconium, manganese, vanadium, niobium, zinc, chromium, gallium, phosphorus (red), iron, cadmium, cobalt, nickel, tin, lead, antimony and copper.

A preferred group of the elements, i.e., those which are more commonly available and which effectively reduce the undesirable oxidation products, and their precursors, appearing in the lubricating oil compositions, are the following: arsenic, aluminum, titanium, zirconium, manganese, zinc, phosphorus, iron, cobalt, nickel, tin and lead.

From a practical or commercial standpoint, it is desirable to use elements which are readily available in the open market place and which are available at a relatively low price, i.e., are in abundant supply.

Any suitable or convenient particle size may be employed. For example, the mesh size of the particles may vary between about $-4$ and about $+250$ mesh, preferably between about $-20$ and about $+150$ mesh, Tyler screen size. The solid particles, converted to micron diameters, then, are in the preferred range of between about 883 microns and about 100 microns. In any event, the solid particles are of sufficiently small size so that no substantial quantity of them will pass through the filter packing material and be circulated in the oil. Most commercially available oil filters in use at the present time will retain discrete particles of 25 microns or larger, hence, if desired, elements for oil treatment of that size may be employed, though 100 microns and larger particles are preferred. It is desired that the particles be sufficiently large so that they are retained in the porous packing or filtering material in the oil filter or solids retainers in the solids-oil contact chamber. On the other hand, they should be sufficiently small in diameter, i.e., as to each particle, so that a large surface area of the element will be exposed to contact with the oil being circulated through the filter or contact chamber. The particles may be disposed in the filter between layers of porous paper, glass wool, cotton linters, coarse woven cotton cloth and the like or they may be packed in small containers of porous cloth or paper which are separately incorporated within the structure of the oil filter. They may also be retained in the filter or in another separate chamber by fine mesh screen, i.e., of the order of 160–200 mesh which serves as a support and retainer for the solid particles.

No specific structural design of the filter element is necessary. Preferably, the solid particles of reducing agents should be retained in the filter and not be entrapped or carried with the oil from the filter packing chamber, or filter to the engine, although some small amounts in colloidal form or dissolved in the entrained water may be removed from the filter and be carried into the crankcase oil sump. In ordinary automotive internal combustion engines having an oil capacity of 4 or 5 quarts of lubricating oil, the oil filter or other chamber should contain, either as such, or impregnated on the filter medium, between about 10 and about 150 grams of the selected elemental reducing agent or agents, in solid form. Such an amount is sufficient to enable the filter to retain, during its normal life of operation, an amount of elements over and beyond that amount taken up by any water with which the elements come into contact during the course of the normal operation of the engine between oil changes. If desired, however, it is, of course, proper that larger or smaller amounts of such elements be incorporated depending upon the particular usage of the engine and the amount of engine running time elapsing between filter changes or chamber rechargings.

Also the solid particles of the elements may be formed into pellets after first having been comminuted to mesh size smaller than, for example, 150 mesh. In this case, a binder is desirably employed which binder may be any inert material, such as, for example, a swelling-type bentonite clay which has been moistened with water, diatomaceous earth, kieselguhr, kaolin, activated clay, charcoal, activated carbon, fuller's earth or any other inert relatively porous carrier.

The oils employed in association with the present invention are those customarily employed in lubricating internal combustion engines including automotive engines, diesel engines, both of the light and heavy duty types, and, in fact, for lubricating any engine employing lubricating oils for the purpose of lubricating the bearings, piston walls, valves, etc. of such engines. These oils are many and of varied types. The invention and its success in the use of the reducing agents in oil filters do not depend upon the use of any particular lubricating oil but the invention is applicable to all such oils heretofore used in these lubrication systems. As is well known and recognized, these oils may be of paraffinic, naphthenic or mixed types and they may contain the conventional additives which are customarily employed in such oils such as, for example, viscosity index (V.I.) improvers, pour point depressants, antioxidants, sludge dispersants, antiwear agents, etc.

In the runs carried out as set forth in the following examples, a base blend of a solvent extracted neutral Mid-Continent oil of SAE 10W-30 grade was employed. It contained as conventional additives about 10 wt. percent of polyisobutylene as a V.I. improver, about 3.75 wt. percent of the tetraethylenepentamine condensation product of polyisobutenyl succinic anhydride as a sludge dispersant together with minor quantities of a wax alkylated naphthalene as a pour point depressant. The zinc salt of di($C_4$-$C_5$ alkyl)dithiophosphate, as an antiwear agent, and a conventional antioxidant were also incorporated. The base blend also contained minor amounts (i.e., less than 1 percent) of an overbased calcium petroleum sulfonate. The oil had a pour point of about $-20°$ F. maximum and a V.I. of 136 minimum.

The following examples are given as illustrative of the character of the invention but it is not intended that the invention be limited thereto.

EXAMPLE 1

Thirty packets of filter paper were made up. Into each of those was placed 1 gram of red phosphorus. These packets were then inserted into a conventional porous paper oil filter which is commercially available on the open market. This filter was then employed in running an internal combustion engine having a circulating oil system such as, for example, in automobiles presently being commercially marketed. As a blank or control, another run was carried out employing in the oil filter 30 grams of sand in place of the 30 grams of red phosphorus.

A Cyclic Temperature Sludge Test was carried out as follows:

A Ford 6-cylinder engine was run through alternate temperature controlled cycles. The spark timing was set at 11° BTDC (before top dead center). The air to fuel ratio was maintained between 13.7:1 and 14.5:1 and the engine was placed under constant load of 140 foot lbs. of torque and was run at 1,500 r.p.m., ±15 r.p.m. The first cycle lasted 5 hours and the oil sump temperature was maintained at 150° F., ±5° F. Following this, a second cycle lasting 2 hours was employed, the oil sump temperature being maintained at 215° F., ±5° F. The two cycles were alternated, in sequence, until the desired total test hours had elapsed. Makeup oil was added as required so as to maintain the oil level in the crankcase at all times between about 5 and about 5½ quarts. At the end of the specified periods of test time, the engine was inspected by disassembling it sufficiently to permit visual examination of several of the parts, including the rocker arm assembly, rocker arm cover, the cylinder head, the push rod chamber and its cover, the crank shaft, and the oil pan. These parts were visually and quantitatively rated for sludge deposits using a CRC (Coordinating Research Council) Sludge Merit Rating System in which a numerical rating of 10 represents a perfectly clean part, the numerical scale decreasing to a minimum value representing a part covered with the maximum amount of sludge possible. The sludge merit ratings are averaged to give an overall engine merit rating. In all tests, the filter element was one made of porous paper and is readily available on the open market. The comparative tests gave the following sludge merit data:

TABLE I

SLUDGE MERIT RATING

CYCLIC TEMPERATURE ENGINE TESTS

| Test Hours | Red Phosphorus | Sand |
|---|---|---|
| 63 | 9.87 | 9.97 |
| 105 | 9.64 | 9.18 |
| 147 | 6.7 | 6.0 |
| 161 | 6.3 | — |

It is readily apparent that the red phosphorus provided excellent sludge inhibition for a considerably longer period of time than did the additives present in the base oil where the filter contained only sand. The oil employed was the SAE 10W-30 grade previously described.

EXAMPLE 2

In another series of runs, 60 grams of aluminum powder was employed in the filters using the same base oil as described in example 1. This was compared with the same base oil in a Cyclic Temperature Sludge Test of the type described in example 1 wherein the oil filter contained 52 grams of sand. The comparative sludge ratings of this test were as follows:

TABLE II

| Test Hours | Sand | Aluminum Powder |
|---|---|---|
| 63 | 9.97 | 10.0 |
| 105 | 9.18 | 10.0 |
| 147 | 6.0 | 9.9 |
| 200 | — | 6.0 |

EXAMPLE 3

In a third series of cyclic temperature sludge runs using the oil of the preceding examples, 60 grams of zinc powder was compared to the same amount of sand with the following results:

TABLE III

| Test Hours | Sand | Zinc |
|---|---|---|
| 63 | 9.97 | 10.0 |
| 105 | 9.18 | 9.48 |
| 147 | 6.0 | 8.33 |
| 168 | | 7.4 |
| 189 | | 6.2 |

It is readily apparent from this, that, whereas the control oil showed a sludge formation to a 6.0 merit rating after 147 hours, that same sludge rating was not achieved in the case of the aluminum powder until about 200 hours of cyclic temperature sludge running had transpired. This is a marked increase in the resistance to oxidative degradation and sludge formation, in the case of the sludge formation test, when using aluminum powder as compared with the sludge formation occurring in the case of the blank run using sand in the oil filters.

Having now thus fully described and illustrated the invention, what is desired to be secured by Letters Patent is:

1. In the operation of an internal combustion engine wherein a mineral lubricating oil that is used to lubricate said engine is recirculated through a filter, the improvement which comprises employing a filter containing therein solid particles of elemental red phosphorus of sufficiently large size to be retained in said filter.

2. An oil filter through which circulating mineral lubricating oil is passed in connection with the operation of an internal combustion engine, said filter containing elemental red phosphorus in solid particulate form, the size of the particles being sufficiently large to be retained by said oil filter.

3. An oil filter as in claim 2 wherein the phosphorus in the filter is present in the form of −4 to +150 mesh particle size material.

4. An oil filter as in claim 2 wherein the phosphorus is retained within the filter by admixing the said phosphorus with an inert material selected from the group consisting of porous paper, diatomaceous earth, kaolin, kieselguhr, activated clay, charcoal, activated carbon and fuller's earth.

* * * * *